United States Patent [19]

Hart

[11] 4,126,707

[45] Nov. 21, 1978

[54] METHOD OF PROCESSING GRAIN

[76] Inventor: Edwin R. Hart, P.O. Box 665, McKinney, Tex. 75069

[21] Appl. No.: 729,376

[22] Filed: Oct. 4, 1976

[51] Int. Cl.$^2$ ............................ A23L 1/10; A23L 1/20
[52] U.S. Cl. ........................................ 426/462; 241/7; 241/9; 426/460; 426/461; 426/463; 426/464; 426/465; 426/482; 426/483; 426/507; 426/518; 426/807
[58] Field of Search ............... 426/618, 619, 622, 623, 426/627, 629, 630, 634, 635, 653, 419, 443, 459, 460, 461, 462, 463, 464, 465, 467, 482, 483, 489, 481, 507, 518, 807; 99/600, 601, 612, 483, 537, 538, 539, 540, 568, 569, 571, 574, 575, 518, 520, 485; 241/7, 9, 10, 11, 12; 415/89

[56] References Cited

U.S. PATENT DOCUMENTS

| | | | |
|---|---|---|---|
| 1,035,839 | 8/1912 | Anderson | 426/462 |
| 1,258,076 | 3/1918 | Woolner | 241/7 |
| 2,329,403 | 9/1943 | Logue | 426/482 |
| 2,620,841 | 12/1952 | Jacobson | 426/482 |
| 2,806,501 | 9/1957 | Van Dijk | 426/482 |
| 3,222,183 | 12/1965 | Rozsa et al. | 426/482 X |
| 3,419,056 | 12/1968 | Girgis | 426/482 |
| 3,471,855 | 11/1969 | Freeman | 426/482 X |
| 3,962,479 | 6/1976 | Coldren | 426/462 X |

Primary Examiner—Arthur L. Corbin
Attorney, Agent, or Firm—Hubbard, Thurman, Turner, Tucker & Glaser

[57] ABSTRACT

A method for processing grain to provide a flour or grit product suitable for human consumption and by-products suitable for use as animal feed and industrial products which includes forming a slurry of the grain with water and passing the slurry through a plurality of pump stages having turbine pumps equipped with turbine pump impellers to remove the husks from the grain kernels without cracking a substantial portion of the kernels. The slurry is then passed through a centrifuge to remove excess water, surface dried and passed through an aspirator to separate the husks from the grain kernels. The dehusked kernels are sent through a centrifugal impact cracker to break up the kernel and separate the germ and oil from the endosperm. The broken kernel pieces are then milled to produce flour.

12 Claims, 4 Drawing Figures

FIG. I

METHOD OF PROCESSING GRAIN

BACKGROUND OF THE INVENTION

This invention relates to the processing of grains and, more particularly, to an improved process especially useful for milling grain sorghum.

Grain sorghums offer a tremendous potential as a world food supply. Sorghums grow over a wide range of climatic conditions. They provide a higher yield per acre than smaller cereal grains, comparable to or greater than corn. Additionally, grain sorghums have a higher protein content than corn, although less than that of hard winter wheat. However, in spite of the foregoing advantages, grain sorghums are not used widely for human consumption in the United States and other highly developed countries. This is due to the fact that flour milled by conventional processes from grain sorghums has a bitter taste from the tannic acid content of the grain. Also, the color of the conventionally processed flour makes it undesirable for baked goods. Additionally, it has been found that if a conventional roller mill is used in processing grain sorghums, the flour has a gritty aftertaste.

It would be desirable to provide a method for processing grain sorghums that overcomes those disadvantages because flour made from grain sorghums has the potential for being a superior food product. Such flour is a low gluten flour, desirable for making soft baked goods. When grain sorghum flour is blended with wheat flour, the mixture has baking qualities equivalent to soft wheat flour but at a savings in cost on the order of 10%. By controlling the ratio of sorghum flour to wheat flour, the quality of the mixture can be maintained constant, even though the quality of the individual flour may vary as a result of changing climatic conditions. Additionally, flour produced from grain sorghum is bland and accepts flavors very well, thereby reducing the amount of flavoring and sweeteners required by many recipes. Still further, grit by-products from the processing of grain sorghums can be utilized to replace corn grit in extruded food products at savings in the order or 10%. This grit in large particles can also be substituted for rice with a higher nutritional value at less than half the cost and can be precooked and reshaped to be equivalent to instant rice products. The grit products tend to hold up better than similarly prepared rice, and can be prepared in the same manner as regular rice.

Thus, with a proper processing method, grain sorghums have the potential of providing an economical food product which additionally gives the capability to develop new products and flavors.

SUMMARY OF THE INVENTION

In accordance with the principles of this invention, an improved method for the processing of grain includes the steps of mixing cleaned grain kernels with water to form a thick slurry, pumping the slurry through a plurality of stages of pumps equipped with throttle valves to remove the husks from the kernels, centrifuging the slurry to remove excess water, surface drying and aspirating to separate the husks from the kernels. Grains other than sorghums can then be milled. However, in the case of sorghums, the additional steps of separating the germ and oil from the endosperm is necessary and preferably a hammer mill is used to form the flour. A centrifugal impact cracker is preferred for performing the separation step.

DESCRIPTION OF THE DRAWINGS

The foregoing will be more readily apparent upon reading the following description in conjunction with the drawing in which.

DESCRIPTION OF THE PREFERRED EMBODIMENT

Figure 1:
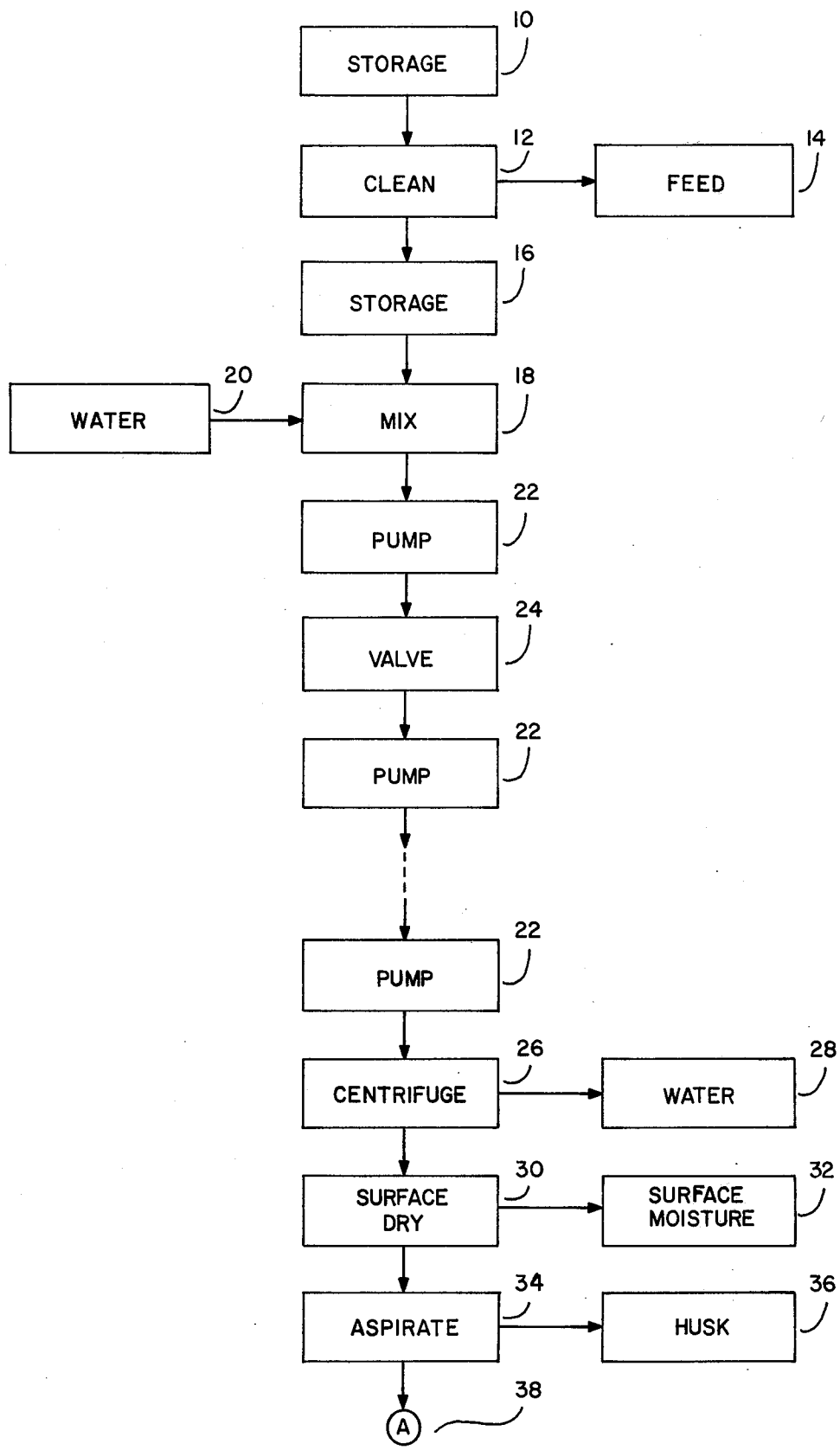
FIG. 1 is a flow diagram illustrating steps in accordance with the principles of this invention for removing the husks from the grain sorghum kernels.

Referring now to FIG. 1, shown therein is a flow diagram of an improved method for removing and separating grain husks from kernels. This method is especially useful in the processing of grain sorghums and in particular for the processing of milo. The method is initiated by removing the grain from storage, step 10, and then cleaning the grain at step 12. This step of cleaning is to remove dirt, trash, cracked or small seed and other grains which may be utilized as feed, 14. A conventional cleaner may be utilized such as that used for cleaning seed. The cleaned grain is then put in intermediate storage, 16, until further processing is to take place.

When it is desired to continue processing the grain, it is sent to a tank for mixing, at step 18, with water, 20, to form a very heavy slurry. During the mixing process, the water level in the mix tank is preferably maintained so that there is approximately two pounds of water for every one pound of grain. It has been found that this heavy slurry gives improved results, but the ratio of water to grain is not critical.

The slurry is then sent through a plurality of pumping stages, 22, each consecutive pair of which is separated by a pressure reducing valve, 24. Improved results are achieved by using an open bowl turbine pump with the impellers raised to make the pump inefficient and to pass the grain as a whole kernel without cracking the grain. In some instances, it is necessary to remove some of the material, of which the pump impellers are constructed, from the pump impellers to provide the necessary clearance. It has been found that as many as 60 or more pump stages may be utilized to give the desired result, which is a removal of the husk from the kernel. The purpose of each of the valves, 24, is to act as a pressure reducing valve and to retard flow of material. The output of each pump stage is suitably at a pressure of approximately 20 psi and that the pump input is suitable at a pressure in the range of 2 to 3 psi. It is possible to work at higher pressures but the lower pressure provides a lower power consumption and hence a lower cost. The valve, 24, is a pinch valve in which air pressure against a deformable tube within a casting is utilized to reduce the pressure but the deformable tube does not allow any clogging to take place. Illustratively, the transit time through the pump stages is in the order of eighteen minutes.

After the slurry has passed through the pumps, it is sent through a centrifuge, 26, which removes excess water, 28. The slurry is then surface dried, 30, illustratively by means of a fluidized bed dryer which only removes the surface moisture, 32. In effect, the surface drying only dries the husk and the surface of the kernel while much of the internal moisture of the kernel remains. As part of the dryer there is provided an aspirator hood which aspirates, 34, the surface dried mixture of husk and kernel to remove the dried and lighter husk, 36. The step of surface drying, 30, is relatively short and provides many advantages. Primarily, the cost of drying is significantly reduced, a relatively low temperature of approximately 150° F being used. It has also been found that if the kernels of the grain sorghum are moist, the succeeding process steps are much more effective. A moisture content of approximately 22% at the output of the fluidized bed dryer is suitable. It is only necessary that the husk be sufficiently dry to be removed by the aspirator. While the surface moisture is removed, much of the internal moisture remains.

Figure 2:
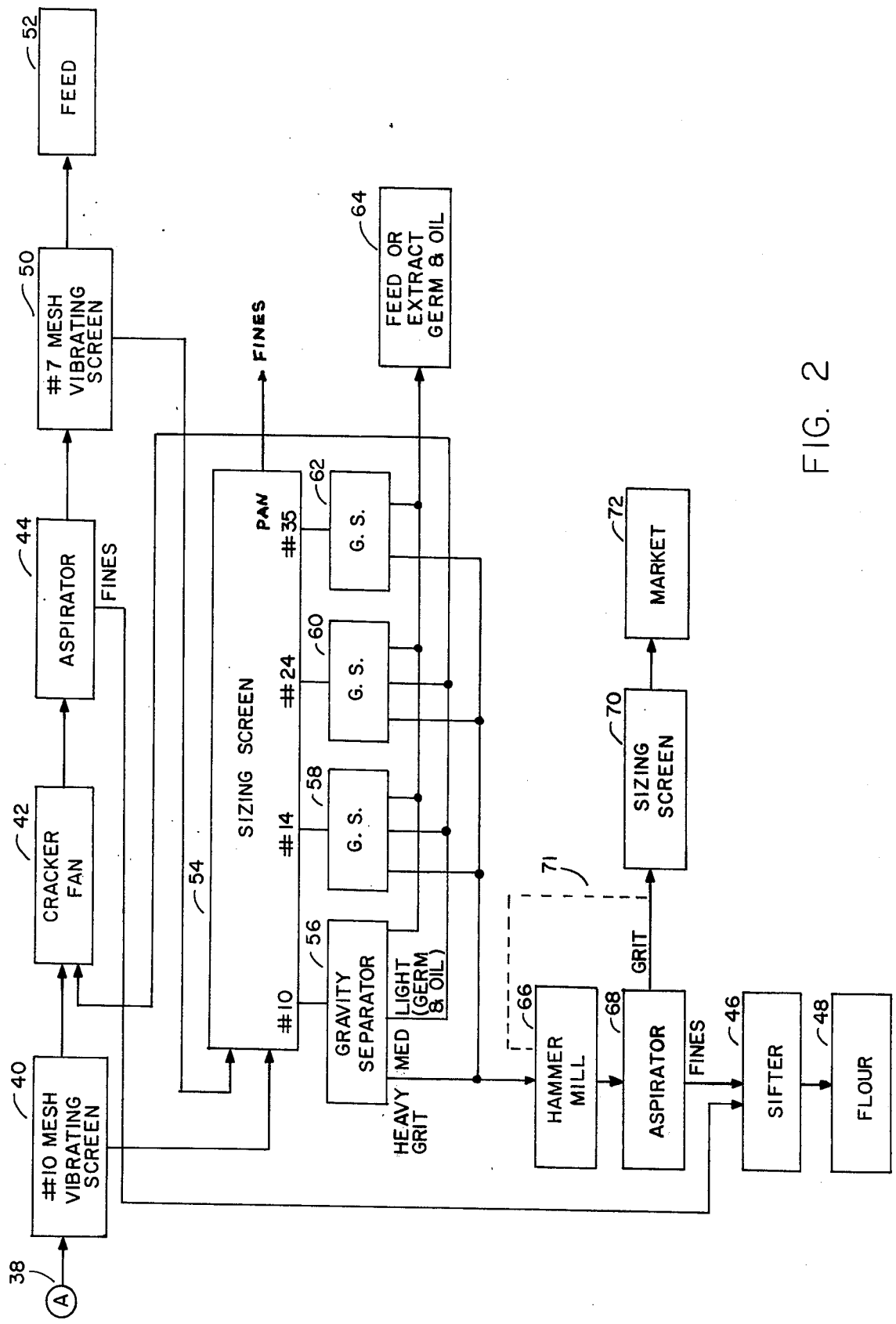
FIG. 2 is a flow diagram showing the steps in the processing of grain sorghum after the husks have been removed in accordance with the steps of FIG. 1.

Referring now to FIG. 2 depicted therein is a flow diagram showing the processing of dehusked grain sorghum kernels, picking up at point A denoted by reference numeral 38, from FIG. 1. The dehusked kernels can be, but are not necessarily, sent through a No. 10 mesh vibrating screen stage, 40. The pieces which do not pass through the screen, but rather remain on the screen, are sent to a centrifugal impact cracker 42. The cracker is suitably a centrifugal fan which has flat blades extending radially outward from a central rotating shaft and a conical member at its input side to direct the incoming kernels toward the outer half of the blades. The impact of the blades hitting flat against the kernels causes the kernels to be broken into smaller pieces. The presence of internal moisture contributes to better separation of the germ and oil from the endosperm. These pieces are sent to an aspirator stage, 44, which separates the very fine and dust-like particles from the heavier and larger broken pieces. These dust-like particles are then sent to a final sifter, the output of which is grain sorghum flour, 48, suitable for human consumption. The larger pieces which pass through the aspirator stage 44, are then sent to a No. 7 mesh vibrator screen stage, 50. The unbroken pieces which do not fall through the screen, 50, are normally grains other than sorghum, and are utilized as animal feed, 52. The smaller pieces which fall through the No. 10 mesh vibrating screen, 40, and the No. 7 mesh vibrating screen, 50, are sent through a sizing screen stage, 54, which includes Nos. 10, 14, 24 and 35 sizing screens and a pan for collecting the fines.

In sizing screen stage 54, the pieces of kernel are separated into four sized groups. The pieces of a size larger than No. 10 mesh go to gravity separator stage, 56. The pieces in size between No. 10 and No. 14 mesh go to gravity separator stage, 58. The pieces in size between No. 14 and No. 24 mesh go to gravity separator stage, 60. The pieces between No. 24 and No. 34 mesh go to gravity separator stage 62. The pieces that are smaller than No. 35 mesh are collected in a pan and are fines that can go directly to the sifter. The first three gravity separator stages separate their respective particles into heavy, medium and light weights. The last gravity separator stage, 62, separates its particles into heavy and light weight.

The lighter mass particles have been found to contain the germ and oil of the kernels and may be used as a feed by-product or the germ and oil may be extracted at stage, 64. The medium density particles usually comprise some germ or oil attached to an endosperm particle, and are returned to the cracker, 42. The heavy endosperm particles are sent to a hammer mill stage, 66.

When processing grain sorghums, it has been found that a more suitable product may be obtained through the use of a hammer mill or honey comb mill rather than a conventional roller mill since a higher moisture content can be tolerated. If a grain sorghum is processed in a roller mill, it has been found that the flour produced thereby has a gritty after taste, whereas the flour produced by the use of other mills, such as a hammer mill has no such bad after taste. It is believed that the presence of moisture during milling contributed to the reduction in the gritty after taste.

The output of the hammer mill stage, 66, is sent to an aspirator stage, 68. The fine dust-like particles picked up by the aspirator are sent through sifter 46 where they are turned into flour 48 suitable for human consumption. The heavy grit particles not picked up by the aspirator stage, 68, can be either returned to the hammer mill, if only flour is desired as indicated by the dash line 71, or sent to a sizing screen stage 70, from which they may be marketed, 72, as a by-product suitable, for example, for making extruded food products.

The method disclosed with reference to FIG. 1 may also be applied to dehusking corn and wheat. It has been found that utilizing the method disclosed with reference to FIG. 1, approximately a 10% savings in capital equipment cost and a 20% savings in operating cost may be achieved due to the fact that a continuous process is utilized rather than a conventional batch process for dehusking corn and wheat.

Figure 3:
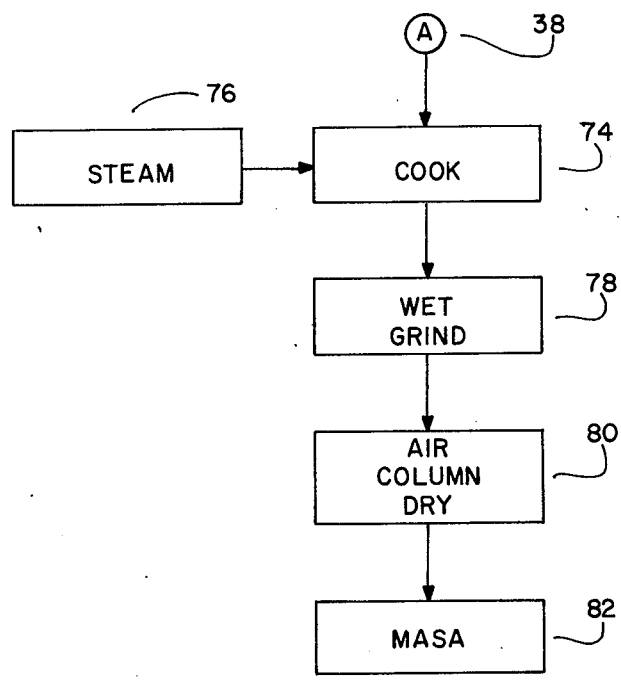
FIG. 3 is a flow diagram showing steps in producing corn meal to form masa if corn rather than grain sorghum is processed in accordance with the flow diagram of FIG. 1.

If it is desired to manufacture masa, a corn meal product, the method disclosed in FIG. 3 for using the dehusked corn which is present at point A in FIG. 1, may be utilized. In this method, the dehusked corn is cooked, 74, utilizing steam, 76. The cooking lasts about 18 minutes, depending on the required glutenization. The cooked corn is then sent through a wet grind stage, 78, and then air column dried, 80, to form the masa, 82. This is a significant improvement over present methods which include adding lime and boiling to glutenize the starches, and steeping at 150° F for 9 to 18 hours to remove the husk. It is important to note that the quality of corn required for making masa using the process of the present invention is much lower than that required in conventional processes, since kernels with stress fractures can be used.

Figure 4:
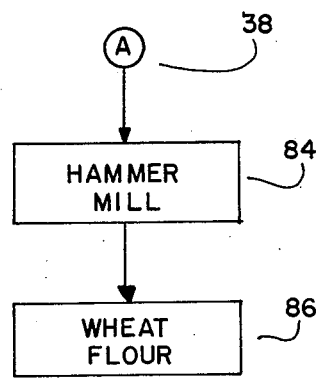
FIG. 4 is a flow diagram showing steps involved in producing wheat flour if wheat is processed in accordance with the flow diagram of FIG. 1.

If it is desired to process wheat which has been dehusked using the method disclosed in FIG. 1, as shown in FIG. 4 the dehusked wheat at point A is sent to a mill, 84, which provides wheat flour, 86, at its output. Conventional sifting and purifying steps, not shown, can be incorporated.

Accordingly, there has been described an improved method for processing grain sorghums, which method may also be utilized for dehusking corn and wheat with a substantial savings in both capital equipment costs and operating expenses. When grain sorghums are processed, according to the disclosed method, the resulting product is substantially less expensive than a corresponding wheat product. A low gluten flour is produced which is especially good for baking soft goods, this flour being bland and accepting flavoring and sweeteners very well. By-products include animal feed having a value which will be nearly equal to the cost of the grain being processed. A grit suitable for use as a rice substitute, but which is more nutritional and less than one-half the cost of commercially available rice products can be obtained. The grit can also be utilized to manufacture extruded food products. It is thus apparent that the improved method according to this invention is a substantial improvement over prior art methods and provides a new use for a widely available and highly advantageous grain.

What is claimed is:

1. A method of processing grain comprising the steps of:
   mixing water with the grain to form a slurry;
   pumping the slurry successively through a plurality of pump stages, each stage having a turbine pump and a turbine pump impeller, in each turbine pump, raised to provide sufficient clearance so that the pump will pass the grain as a whole kernel and separate the husks from the kernels without cracking a substantial percentage of the kernels;
   centrifuging the slurry to remove the water from the grain;
   surface drying the grain; and then
   aspirating the grain to remove the husks from the kernels.

2. The method according to claim 1 wherein the step of pumping comprises utilizing a plurality of pumping stages with pressure reducing valve means intermediate successive pumping stages to maintain a low pumping pressure.

3. The method according to claim 2 wherein each of the pumping stages utilizes a low efficiency open bowl turbine pump.

4. The method according to claim 1 wherein the grain is a sorghum.

5. The method according to claim 4 wherein the sorghum is milo.

6. The method according to claim 1 further comprising the steps of:
   cracking the aspirated kernels;
   sizing and separating the cracked kernels; and
   milling the sized kernels into flour.

7. The method according to claim 6 wherein the milling occurs in a hammer mill.

8. The method according to claim 7 wherein the step of cracking is performed by using a fan having flat blades extending radially outward from a central rotating shaft.

9. The method according to claim 6 wherein the step of cracking is performed by passing the grain through a centrifugal impact cracker.

10. The method according to claim 1 wherein the mixing step comprises adding approximately 2 pounds of water to 1 pound of grain.

11. The method according to claim 1 wherein the grain is wheat and further comprising the step of milling the wheat kernels, resulting from aspirating the wheat, to form flour.

12. A method of processing grain to prepare flour comprising the steps of:
    mixing the grain with water to form a slurry;
    pumping the slurry successively through a plurality of turbine pumps;
    separating the husks from the grain using a turbine pump impeller in each pump, the impeller being sufficiently raised to remove the husks from the grain without cracking a substantial amount of the kernels;
    centrifuging the slurry to remove the water;
    drying the husks and the surface of the kernels;
    aspirating the grain to remove the husks from the kernels;
    cracking the kernels using a centrifugal fan;
    sizing and separating the cracked kernels; and then
    milling the sized kernels into flour.

* * * * *